(12) United States Patent
Tobita et al.

(10) Patent No.: US 8,184,386 B2
(45) Date of Patent: May 22, 2012

(54) FRESNEL LENS AND INJECTION MOLD

(75) Inventors: Shuusuke Tobita, Fujisawa (JP);
Yusuke Ohmura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/634,479

(22) Filed: Dec. 9, 2009

(65) Prior Publication Data

US 2010/0165489 A1    Jul. 1, 2010

(30) Foreign Application Priority Data

Dec. 26, 2008    (JP) .................. 2008-335061

(51) Int. Cl.
*G02B 3/08*    (2006.01)

(52) U.S. Cl. ....................................... 359/742

(58) Field of Classification Search .................. 359/742, 359/743

See application file for complete search history.

(56) References Cited

U.S. PATENT DOCUMENTS 4,871,233 A * 10/1989 Sheiman ........................ 359/464
7,460,301 B2 * 12/2008 Imafuku et al. ............... 359/460

FOREIGN PATENT DOCUMENTS

| CN | 1282887 A | 2/2001 |
| CN | 1906679 A | 1/2007 |
| JP | 6-000892 A | 1/1994 |

* cited by examiner

*Primary Examiner* — Darryl J Collins
(74) *Attorney, Agent, or Firm* — Canon USA, Inc. IP Division

(57) ABSTRACT

A surface of a base material of a Fresnel lens has a central area having circular zones arranged therein and an outer area located on the outer side of the central area and having circular-arc zones arranged therein. The pitch of zones in a boundary area between the central area and the outer area and where the zone shape changes is smaller than a basic pitch which is the pitch of the circular and circular-arc zones in the central area and the outer area.

5 Claims, 9 Drawing Sheets

FRESNEL LENS AND INJECTION MOLD

BACKGROUND OF THE INVENTION

1. Field of the Invention

The present invention relates to Fresnel lenses and to injection molds used when manufacturing Fresnel lenses. In particular, the present invention relates to a Fresnel lens with improved appearance quality when manufactured by plastic injection molding using a mold and to an injection mold.

2. Description of the Related Art

A Fresnel lens has a zonal structure formed by cutting out lens surfaces and concentrically arranging them on a plane, and can be considered as an aggregate of prisms. Generally, in order for a lens to have sufficient refractive power, the curvature of the lens surface needs to be increased and the lens consequently becomes thicker. However, by making the lens into a Fresnel lens, the lens can have a focusing function while having a flat structure, thereby allowing for compactness and high integration properties. Practical examples of Fresnel lenses include rear-projection screens, condensing lenses in overhead projectors, and focusing screens for viewfinders of cameras.

A common Fresnel lens has spherical lens surfaces and zones that are gradually increased in height from the central zone towards the outer zone. The zones are arranged at a fixed pitch of about several tens of micrometers from the inner periphery towards the outer periphery. Small-size Fresnel lenses are usually manufactured by plastic injection molding, and Japanese Patent Laid-Open No. 6-892 proposes a method for forming Fresnel lenses by injection molding. Since injection molding requires shorter cycle time than compression molding, productivity is significantly enhanced. However, since the base material greatly contracts during cooling, the micro-zonal structure on the Fresnel lens surface becomes wedged into the mold, making it difficult to remove the Fresnel lens from the mold. In order to solve this problem, Japanese Patent Laid-Open No. 6-892 discloses a method for facilitating mold removability by setting the temperature of a movable mold higher than a stationary mold to increase the amount of contraction of the resin in the movable mold so that the resin in the movable mold is caused to warp. There is also disclosed a gate shape for avoiding welding which occurs when the resin extends along the zones.

Fresnel lenses sometimes have external shapes other than a circular shape. For example, in a rectangular Fresnel lens, zones in an inner area of the rectangle have a 360° circular shape, whereas zones in an outer area are segmented or divided due to the rectangular shape. In an injection mold used for molding such a Fresnel lens, a section that corresponds to the circular zones have circular grooves with no openings, whereas a section that corresponds to the segmented or divided zones have circular-arc grooves that extend discontinuously to the edges of the mold.

When a Fresnel lens is to be formed by injection molding using such an injection mold, it is difficult to form all of the zones uniformly. Specifically, during a filling process in injection molding, resin is injected into a mold so that it pushes air out of a cavity. In injection molding of a Fresnel lens, the resin filling process is impeded by air in the circular grooves since they have no escape routes for air, whereas the resin filling process is performed smoothly in the circular-arc grooves since they have open ends from which air is discharged as resin is injected. Such a variation in molding characteristics results in a difference in shape between inner zones and outer zones. This will be described below in detail.

Figure 10A:
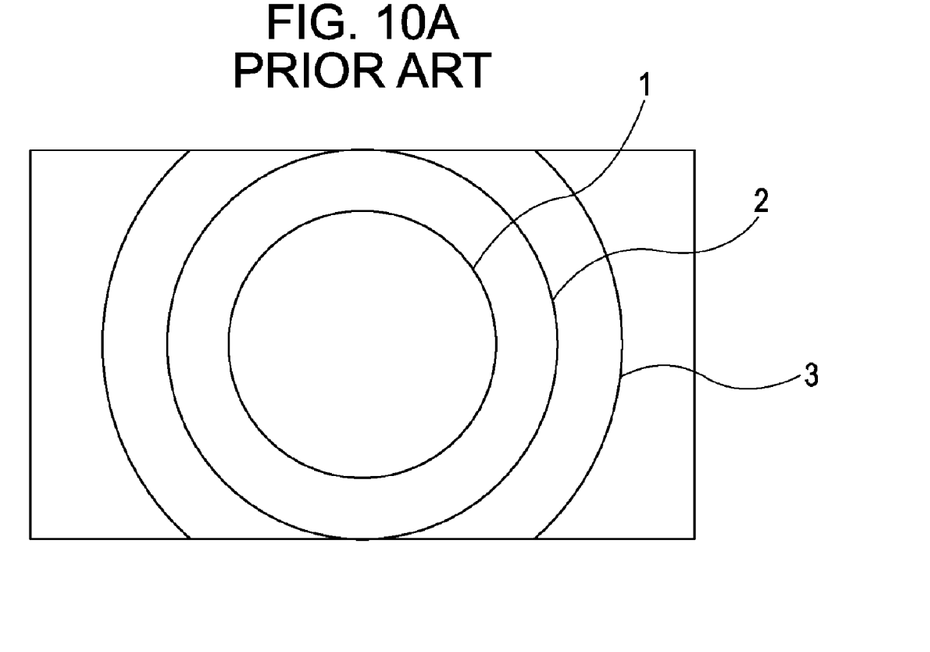
FIGS. 10A and 10B schematically illustrates a rectangular Fresnel lens in which the center of the rectangle is aligned with the center of zones.
Figure 10B:
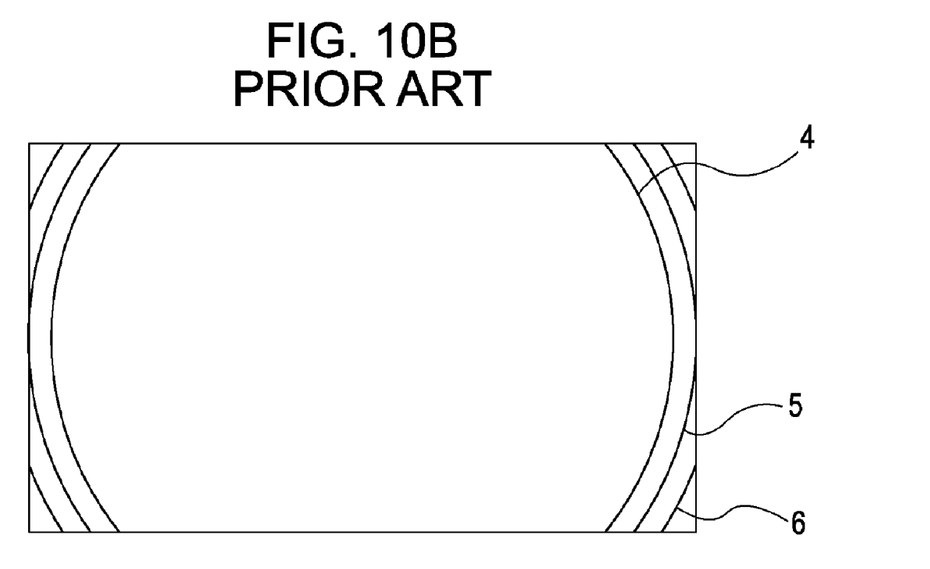

For example, FIGS. 10A and 10B illustrate a Fresnel lens having a rectangular shape. The center of the rectangle and the center of the Fresnel zones are aligned with each other. A zone 1 located on the inner side of a zone 2, which is an inscribed circle of the rectangle, has a 360° circular shape, whereas a zone 3 located on the outer side of the zone 2 is divided into two circular-arc zone segments whose central angle is smaller than 180° (see FIG. 10A). On the outer side of the zone 3 is a zone 4 located on the inner side of a zone 5 that is in contact with the short sides of the rectangle. The zone 4 is divided into two circular-arc zone segments having the same radius. A zone 6 on the outer side of the zone 5 is divided into four zone segments having the same radius (see FIG. 10B).

Figure 11A:
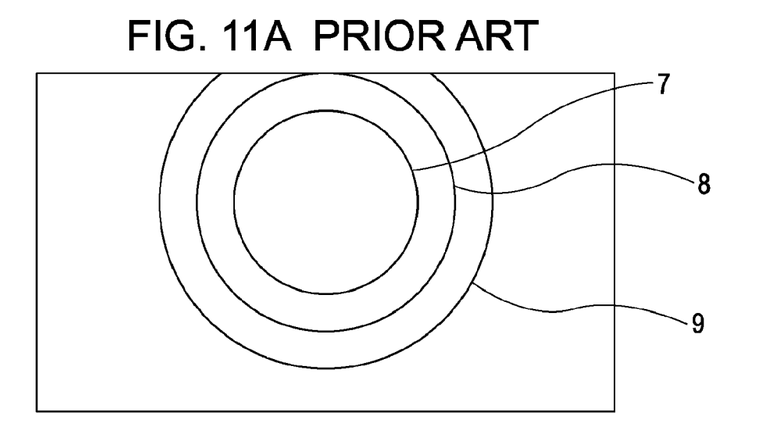
FIGS. 11A to 11C schematically illustrate a rectangular Fresnel lens in which the center of the rectangle is not aligned with the center of zones.
Figure 11B:
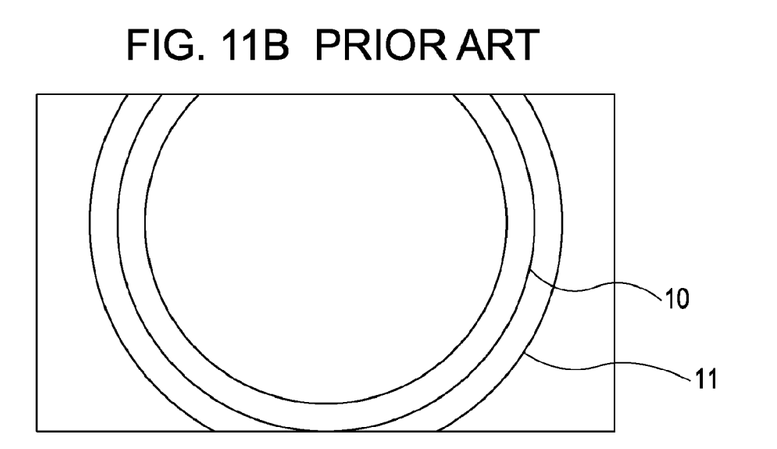
Figure 11C:
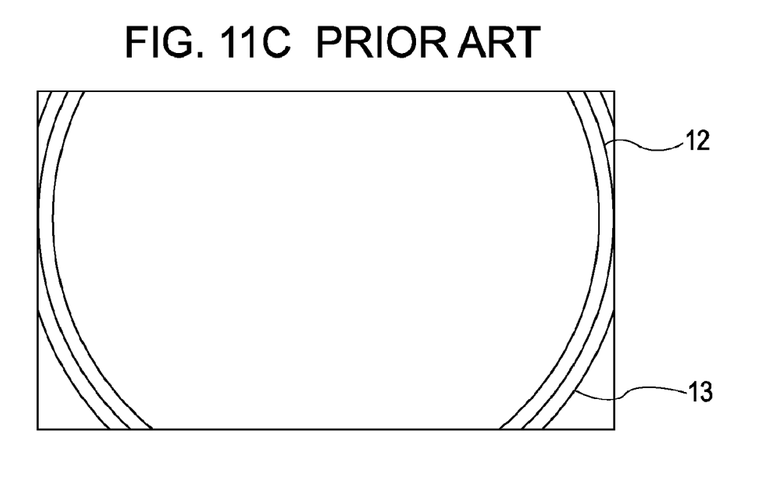

Referring to FIGS. 11A to 11C, when the center of the Fresnel zones is slightly shifted upward relative to the rectangle, the position where the zone shape changes from a circular shape to a circular-arc shape and the position where the number of zone segments with the same radius changes are also shifted. In this case, the aforementioned positions include the following three positions. Specifically, a zone 7 located on the inner side of a zone 8 that is in contact with the long side closer to the center of the Fresnel zones has a 360° circular shape, whereas a zone 9 on the outer side of the zone 8 has a circular-arc shape whose central angle is smaller than 360° (see FIG. 11A). A zone 11 located on the outer side of a zone 10 that is in contact with the long side distant from the center of the Fresnel zones includes two circular-arc zone segments having the same radius (see FIG. 11B). A zone 13 located on the outer side of a zone 12 that is in contact with the short sides includes four circular-arc zone segments having the same radius (see FIG. 11C).

When such a Fresnel lens is formed by injection molding, a boundary area where the zone shape or the number of zone segments changes becomes an area with different molding characteristics on the Fresnel surface. Because this boundary area appears different from other areas, an improvement in appearance quality is in demand.

SUMMARY OF THE INVENTION

The present invention provides a Fresnel lens having a plurality of concentrically-arranged circular and circular-arc zones formed on a surface of a base material thereof. In the Fresnel lens, the surface of the base material includes a central area having the circular zones arranged therein, an outer area located on the outer side of the central area and having the circular-arc zones arranged therein, and a boundary area between the central area and the outer area. The pitch of zones in the boundary area is smaller than the pitch of the zones in the central area and the outer area.

According to an aspect of the present invention, when a Fresnel lens is to be manufactured by plastic injection molding, the appearance of the boundary area where the zone shape changes from a circular shape to a circular-arc shape can be made similar to that of other areas to improve appearance quality.

Further features of the present invention will become apparent from the following description of exemplary embodiments with reference to the attached drawings.

DESCRIPTION OF THE EMBODIMENTS

A first embodiment of the present invention will be described below with reference to the drawings.

Figure 1:
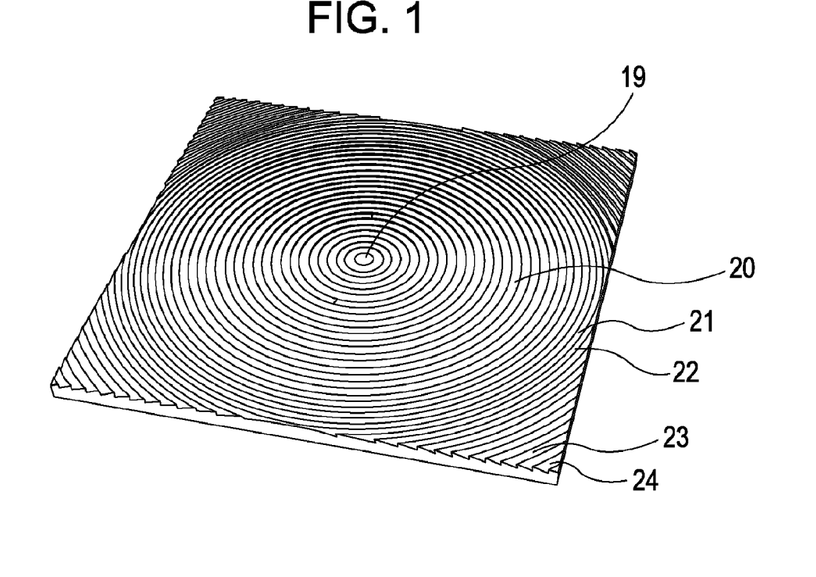
FIG. 1 is a schematic perspective view of a Fresnel lens according to an embodiment of the present invention.

FIG. 1 is a schematic perspective view of a Fresnel lens according to the first embodiment of the present invention. In FIG. 1, the external shape of a base material is square, and the surface thereof has a plurality of concentrically-arranged circular and circular-arc zones. The Fresnel lens according to this embodiment is formed of a plastic base material having 39 concentrically-arranged circular or circular-arc zones formed on the surface thereof.

The surface of the base material has a central area that includes a first zone 19 to a 17th zone 20, which are circular and are part of the plurality of circular zones.

The surface of the base material also has an outer area located on the outer side of the central area and including a 37th zone 23 to a 39th zone 24, which are circular-arc shaped and are part of the plurality of circular-arc zones.

Furthermore, the surface of the base material has a boundary area that includes a 27th zone 21, which is a boundary zone where the zone shape changes from a circular shape to a circular-arc shape, an 18th zone to a 26th zone, which are located on the inner side of the 27th zone 21, and a 28th zone 22 to a 36th zone, which are located on the outer side of the boundary zone.

The zones in the boundary area are arranged at a pitch that is smaller than the pitch of the zones in the central area and the outer area, that is, the basic pitch of the Fresnel lens. The pitch of the zones in the boundary area is at minimum in the 27th zone 21, which is the boundary zone, and increases inward and outward therefrom.

Figure 2:
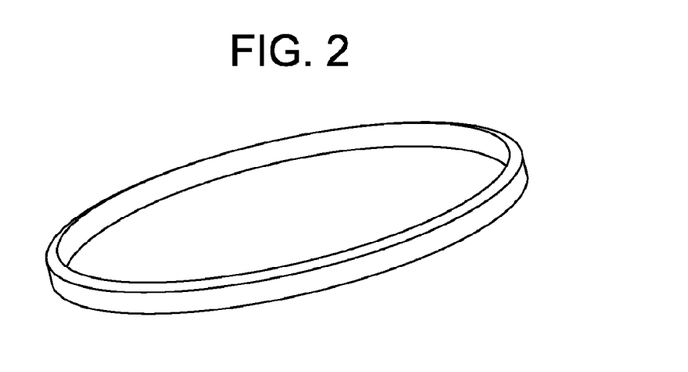
FIG. 2 is a schematic perspective view illustrating a circular zone.
Figure 3:
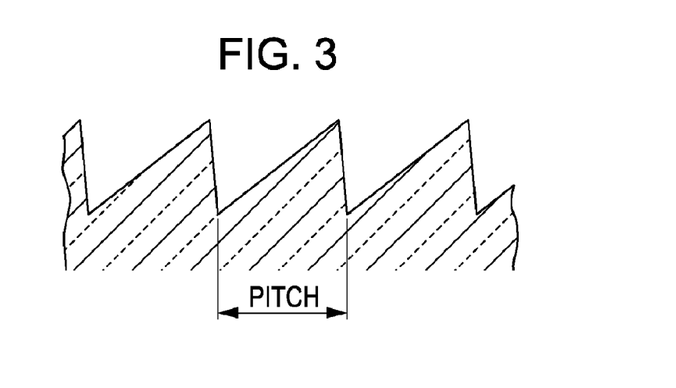
FIG. 3 is a schematic cross-sectional view for explaining the pitch of zones.
Figure 4A:
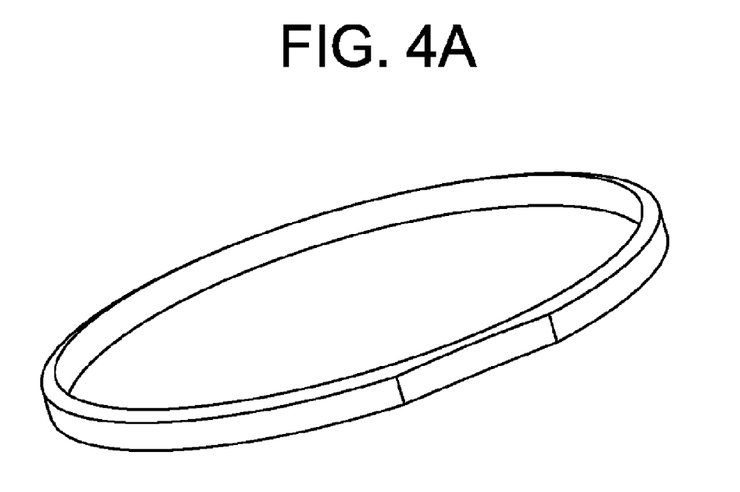
FIGS. 4A and 4B are schematic perspective views illustrating circular-arc zones.
Figure 4B:
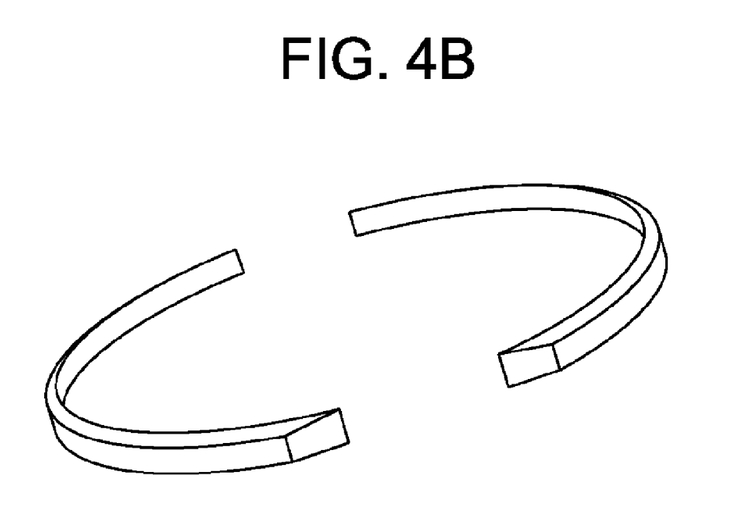

Although the Fresnel lens in this embodiment is described as having 39 circular and circular-arc zones, the number of zones is not limited. The outermost zone is not counted as a zone since it has an incomplete shape due to the edges of the base material. A zone is a single-thread surface obtained by cutting out a lens surface (FIG. 2), and the pitch of the zones is defined as a horizontal distance measured between two neighboring troughs of a zone (FIG. 3). A zone having a circular shape means that the zone extends continuously in a complete circle (FIG. 2). A zone having a circular-arc shape is equivalent to a partially-noncircular zone (FIG. 4A) or a zone divided into segments (FIG. 4B). The zone shown in FIG. 4B may sometimes be referred to as zone segments having the same radius.

In this embodiment, the zone shape changes from a circular shape to a circular-arc shape at the boundary between the 27th zone 21 and the 28th zone 22. The 28th zone 22 to the 39th zone 24 are each divided into four zone segments having the same radius.

In this embodiment, the 27th zone 21, which is the boundary zone where the zone shape changes from a circular shape to a circular-arc shape, has a minimum pitch which is two-thirds of the basic pitch. A plurality of inner zones (nine zones in this embodiment) located on the inner side of the 27th zone 21 and a plurality of outer zones (nine zones in this embodiment) located on the outer side of the 27th zone 21 constitute the boundary area where the zone shape changes from a circular shape to a circular-arc shape. Although a boundary zone is a zone where the zone shape changes (i.e., the 27th zone 21 in this embodiment), a boundary zone may also include a zone deviated from the boundary zone by about several zones. Furthermore, the term "minimum pitch" refers to the minimum pitch within the boundary area.

In the boundary area, the zone pitch increases asymptotically to the basic pitch inward from the 27th zone 21, and also increases asymptotically to the basic pitch outward from the 27th zone 21. To describe the variation in the zone pitch from the innermost zone, the first zone 19 to the 17th zone 20 have the fixed basic pitch. The pitch then decreases asymptotically outward therefrom until reaching the minimum pitch in the 27th zone 21, and then increases asymptotically outward therefrom. The 37th zone 23 to the 39th zone 24 have the fixed basic pitch. In this specification, an area having the circular zones arranged at the fixed basic pitch (the first zone 19 to the 17th zone 20 in this embodiment) is referred to as the central area. An area located on the outer side of the central area and having the circular-arc zones arranged at the fixed basic pitch (the 37th zone 23 to the 39th zone 24 in this embodiment) is referred to as the outer area. An area where the zone shape changes from a circular shape to a circular-arc shape and which serves as a boundary between the central area and the outer area is referred to as the boundary area. The term "basic pitch" is used to describe the basic pitch of the Fresnel lens and is the pitch of equally-spaced zones that occupy the major portion of the Fresnel surface.

Accordingly, when a Fresnel lens is to be manufactured by plastic injection molding, setting the zone pitch in the boundary area smaller than the basic pitch can advantageously allow for a less noticeable difference in visibility that occurs in the boundary area, which is where the zone shape changes from a circular shape to a circular-arc shape. This is because a difference in shape between neighboring zones that can occur when performing injection molding is alleviated.

A difference in appearance and a difference in visibility caused due to a variation in injection molding characteristics will now be described.

Figure 5A:
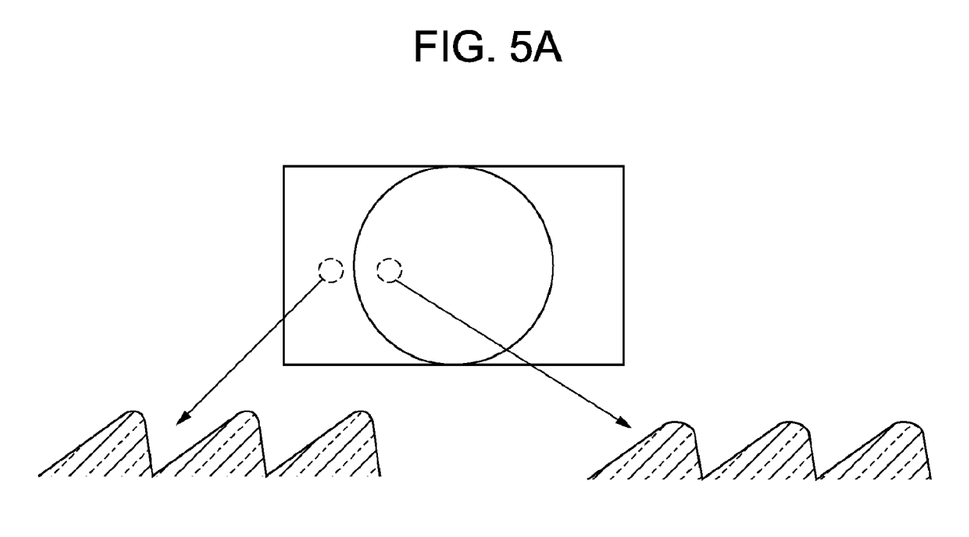
FIGS. 5A and 5B schematically illustrate a variation in shape caused in injection molding.
Figure 5B:
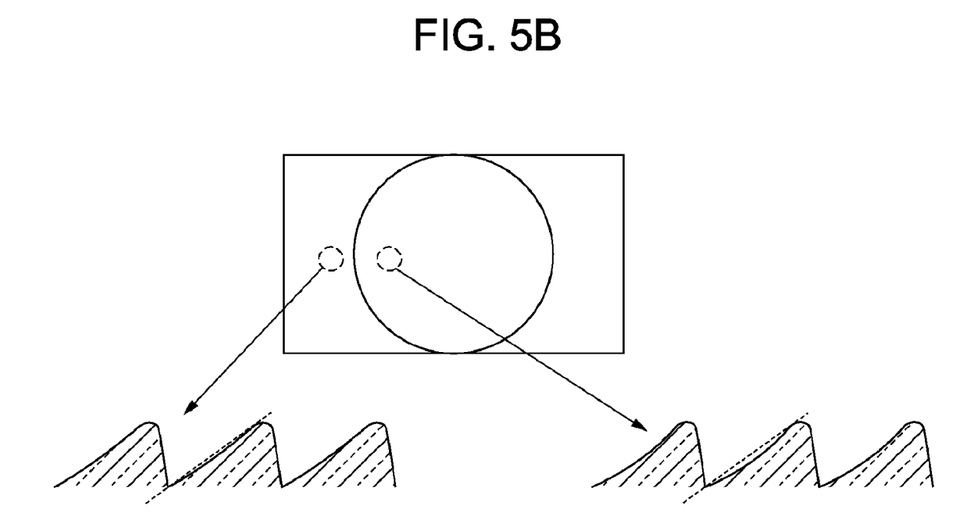

A difference in visibility can sometimes occur between the boundary zone 21, which is where the zone shape changes from a circular shape to a circular-arc shape, and other areas, as shown in FIG. 1. This is conceivably due to whether or not there is an escape route for gas, such as air, during injection molding. As shown in FIG. 5A which is a schematic partial cross-sectional view, the resin (plastic) filling rate is different between the zones on the inner and outer sides of the boundary zone 21, or, as shown in FIG. 5B which is also a schematic partial cross-sectional view, the deformation rate differs among the slopes of the zones (lens surfaces). The difference in shape may provide a difference in visibility between areas. In these drawings, troughs are illustrated at an increased scale for explanatory purposes.

In light of this, in the present invention, the zone pitch in the boundary area including the boundary zone where the zone shape changes from a circular shape to a circular-arc shape, at least one zone on the inner side of the boundary zone, and at least one zone on the outer side of the boundary zone is set smaller than the zone pitch in other areas.

One conceivable reason for the occurrence of a difference in visibility is an extreme change in the zone shape in the boundary area where the zone shape changes from a circular shape to a circular-arc shape. Therefore, by setting the actual zone pitch in the boundary area smaller than the zone pitch in the surrounding areas, the absolute amount of deformation in the zone shape in injection molding can be reduced. In the boundary area, if the pitch of multiple zones on the inner side of the boundary zone and the pitch of multiple zones on the outer side of the boundary zone are to be varied, it is preferable that the variation itself be made unnoticeable in terms of appearance. Therefore, it is preferable that the boundary zone have a minimum pitch and that the pitch of the multiple zones existing between the zones in the central area and the zones in the outer area be varied gradually toward the basic pitch.

The following description is directed to a second embodiment in which the Fresnel lens according to the present invention is applied to an optical component of a camera. An image observed through a viewfinder of a single-lens reflex camera is an image captured in the camera through an imaging lens and displayed on an optical component, which displays a projection location, via a mirror. The optical component is generally called a focusing plate, a focusing glass, a focusing screen, or the like but will be collectively referred to as "focusing plate" hereinafter. The focusing plate has the shape of a plate and is formed by bonding together a Fresnel lens having a function of collecting light and a matt-surface member having a function of forming an image in the form of a screen.

Figure 6:
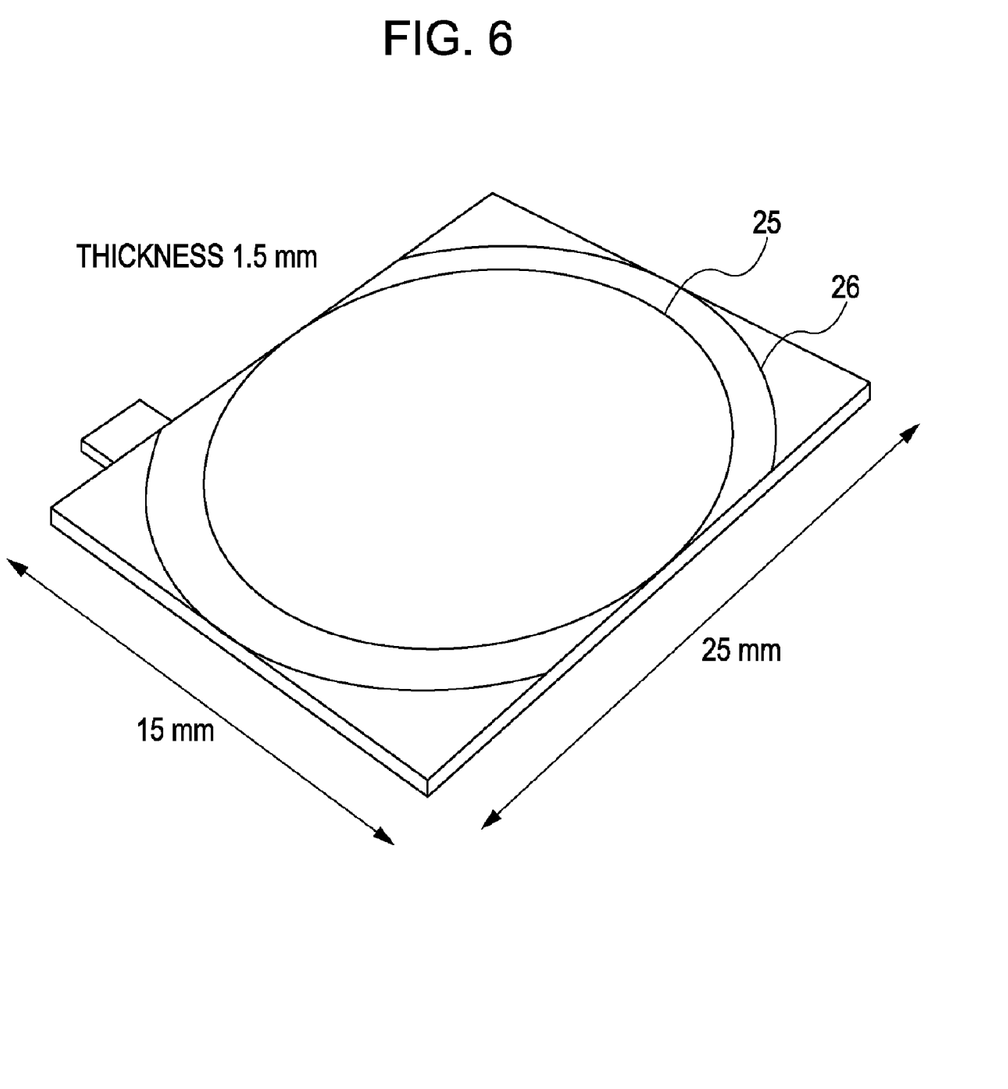
FIG. 6 is a schematic perspective view of a focusing plate of a single-lens reflex camera.

FIG. 6 is a schematic perspective view of a focusing plate of a single-lens reflex camera according to an embodiment. The focusing plate has a rectangular shape with a length of 25 mm, a width of 15 mm, and a thickness of 1.5 mm. On a Fresnel surface having zones arranged at a basic pitch of 30 µm, the inclination angle of the lens surfaces of the zones increases from the center towards the outer area, and the lens surface of the outermost zone has a height dimension of about 20 µm. In the Fresnel lens, the zone shape changes from a circular shape to a circular-arc shape from the inner side of a boundary zone 25 which is in contact with the long sides of the rectangular focusing plate. In a zone 26 whose two sections are in contact with the short sides of the rectangular focusing plate, the number of circular-arc zone segments having the same radius varies from two to four from the inner side of the zone 26. A zone having a circular shape means that the zone extends continuously in a complete circle (FIG. 2). A zone having a circular-arc shape is equivalent to a partially-noncircular zone (FIG. 4A) or a zone divided into segments (FIG. 4B). The zone shown in FIG. 4B will be referred to as zone segments having the same radius. When comparing the zone 25 with the zone 26, a variation in molded state and a difference in appearance caused by this variation tend to be particularly significant in the zone 25. Therefore, the following description will be directed to an example where the Fresnel zone pitch is varied only in the zone 25 and the vicinity thereof. The widths of areas where the pitch is to be varied, that is, the central area, the outer area, and the boundary area, are appropriately selectable where necessary. Although a section (zone) to be given the minimum pitch is basically the zone 25, the boundary zone in this case may also include, in addition to the zone 25, a zone deviated from the zone 25 by about several zones.

Figure 7:
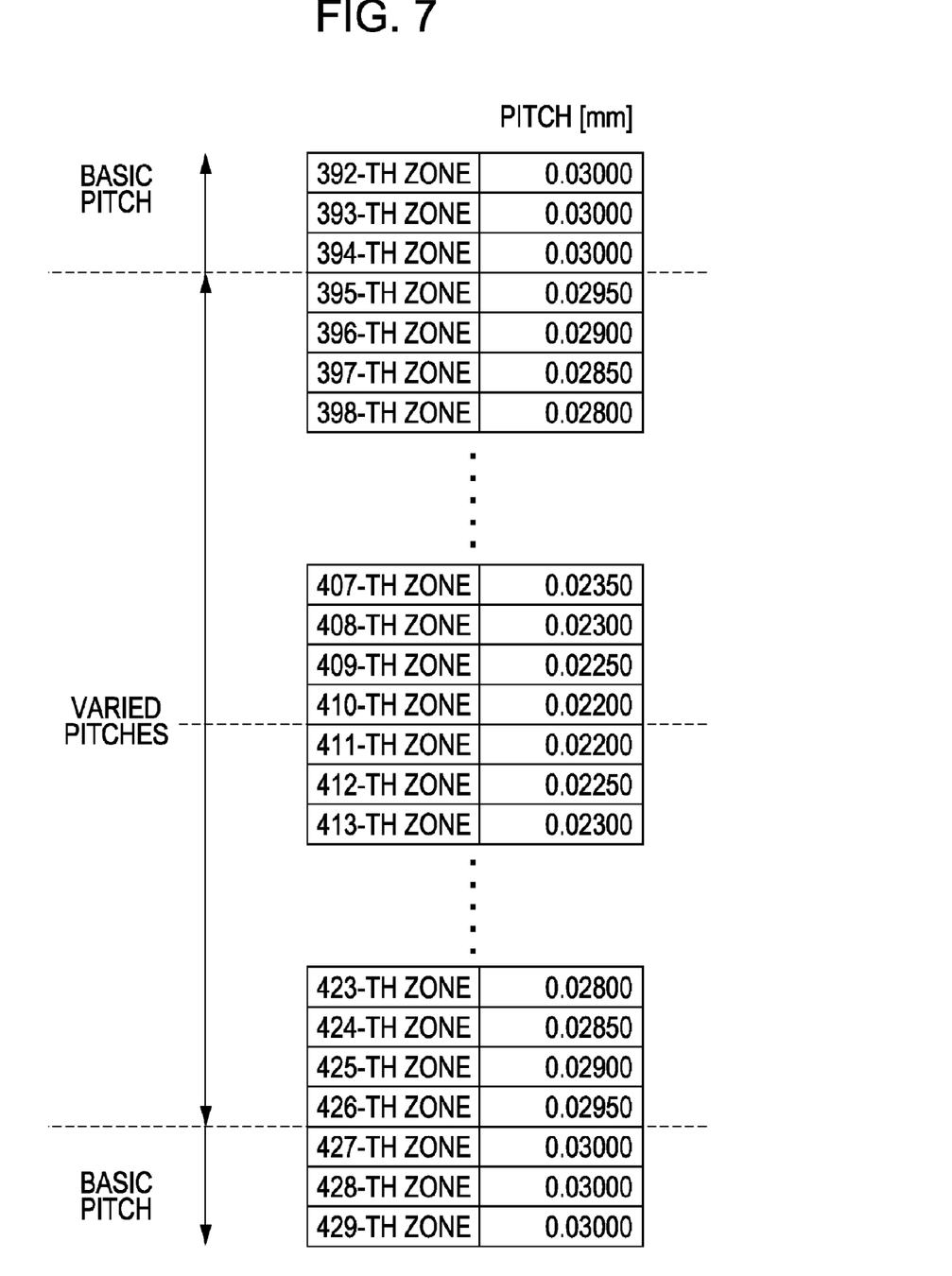
FIG. 7 schematically illustrates a zone-versus-pitch relationship.

In this embodiment, the total number of zones is 728, with the 409th zone having the shape of a complete circle, the 410th zone having a partially-noncircular-arc shape, and the 411th zone including completely bisected circular-arc zone segments. Since the section where the zone shape changes extends over three zones, two zones are given the minimum pitch in this embodiment so as to achieve a more reliable effect. Specifically, the 410th zone and the 411th zone are given a minimum pitch of 22 µm (0.022 mm). The zones to be given the minimum pitch can be appropriately selected while including nearby zones where the zone shape changes. The pitch of the remaining zones in the boundary area that are located on the inner and outer sides of the aforementioned zones is incremented by 0.5 µm until reaching the basic pitch of 30 µm (0.03 mm). Specifically, the zone distribution from the inner side is such that the first zone in the center to the 394th zone have the basic pitch of 30 µm and the pitch is decremented by 0.5 µm from the 395th zone. In the 410th zone and the 411th zone that are adjacent to the boundary where the zone shape changes from a circular shape to a circular-arc shape, the pitch is at minimum at 22 µm within the boundary area. The pitch is then incremented by 0.5 µm outward therefrom, and the 427th zone and onward are given the basic pitch of 30 µm (FIG. 7).

Accordingly, when a Fresnel lens is to be manufactured by plastic injection molding, setting the zone pitch in the boundary area smaller than the basic pitch in this manner advantageously allows for a less noticeable difference in appearance that occurs at the boundary and the vicinity thereof, where the zone shape changes from a circular shape to a circular-arc shape. This is because a difference in shape between neighboring zones that can occur when performing injection molding is alleviated.

Although the configuration of a boundary area including the zone 25 that is in contact with the long sides of the rectangular focusing plate has been described above, a boundary area including the zone 26 that is in contact with the short sides of the rectangular focusing plate can be similarly given the following configuration. Specifically, the outer area on the surface of the base material (i.e., an area on the outer side of the 427th zone) is constituted by a first area portion having two circular-arc zone segments with the same radius and a second area portion having four circular-arc zone segments with the same radius. The first area portion is on the outer side of the zone 25 but on the inner side of the zone 26, whereas the second area portion is on the outer side of the zone 26. A second zone located in the outer area and where the shape changes will be referred to as "outer boundary zone" (which corresponds to the zone 26 in this embodiment). An outer boundary area that includes multiple zones on the inner and outer sides of the outer boundary zone is formed. In the outer boundary area, the circular-arc zone segments are arranged at a pitch that is smaller than the basic pitch. The pitch of the circular-arc zone segments in the outer boundary area is at minimum in the outer boundary zone and increases inward and outward therefrom. The term "minimum" in this case means a minimum pitch within the outer boundary area but does not necessarily mean the minimum pitch in the entire Fresnel lens. Although a section (zone) to be given the minimum pitch is basically the zone 26, the boundary zone in this case may also include, in addition to the zone 26, a zone deviated from the zone 26 by about several zones.

To form the surface of the base material of the Fresnel lens described above by transferring, an injection mold is used. This injection mold has a shape transfer surface with a shape that corresponds to the shape of the base-material surface of the Fresnel lens (i.e., a shape with projections and depressions that are inverted relative to those on the base-material surface of the Fresnel lens).

Various additional examples of the present invention will be described below.

A first additional example will be described with reference to FIG. 8.

A Fresnel lens according to the second embodiment is manufactured by injection molding. The minimum pitch of the zones in the boundary area is 22 μm, and the variation width of the zone pitch (i.e., the amount of pitch variation between neighboring zones having different pitches) is 0.5 μm, which corresponds to a rate of 1.67% with respect to the basic pitch of 30 μm.

The injection mold used here is formed by a turning process such that the mold has 728 concentrically-arranged grooves having a shape with projections and depressions that are inverted relative to those of the zones on the Fresnel lens. A first groove to a 394th groove from the center are given the basic pitch of 30 μm. The pitch is then decremented by 0.5 μm from a 395th groove, and a 410th groove and a 411th groove, which correspond to boundary zones where the groove shape changes from a circular shape to a circular-arc shape, are given a minimum pitch of 22 μm. The pitch is then incremented outward therefrom by 0.5 μm, and a 427th groove and onward are given the basic pitch of 30 μm.

A Fresnel lens according to the first additional example of the present invention is manufactured by plastic injection molding using the above-described mold.

As a comparison example, a Fresnel lens whose zones are entirely arranged at an equal pitch is manufactured with conditions similar to those in the first additional example according to the present invention by using a mold having a shape transfer surface different from that in the first additional example according to the present invention.

With regard to the Fresnel lens according to the first additional example and the Fresnel lens according to the comparison example, the distribution condition of the amount of deformation in the zonal lens surfaces, that is, the zone-slope deformation amount X (μm) (shown as "um" in FIG. 8) is measured. The measurement result is shown on a graph in FIG. 8. In FIG. 8, the Fresnel lens according to the first additional example is represented as "varied pitches", whereas the Fresnel lens according to the comparison example is represented as "equal pitch". The abscissa of the graph shows the positions of inner zones using negative values and the positions of outer zones using positive values, with the boundary zone where the zone shape changes from a circular shape to a circular-arc shape being set as "0". The numerical values on the abscissa are expressed with a freely-chosen unit, and the range shown on the graph corresponds to the section with varied pitches (i.e., the boundary area) in the present invention.

Figure 8:
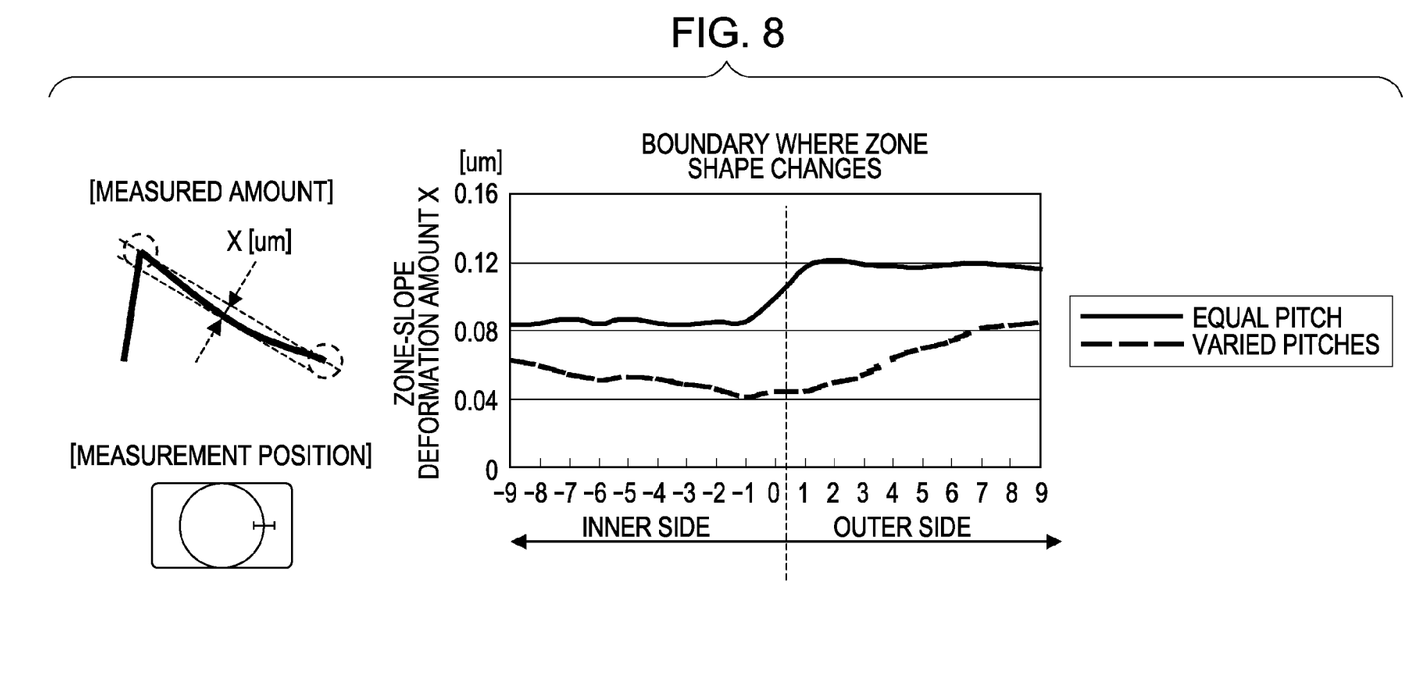
FIG. 8 illustrates an additional example of the present invention.

It is apparent from the graph in FIG. 8 that the rate of change in the shape of neighboring zone slopes is alleviated in and near the boundary where the zone shape changes. This effect allows for reduced difference in appearance and reduced difference in visibility on the actual viewfinder, as compared with a common Fresnel lens having an equal pitch, and the quality of the focusing plate is enhanced.

A second additional example will be described with reference to FIG. 9.

A Fresnel lens is manufactured in a similar manner to that in the first additional example except that the minimum pitch and the variation width of the zones in the boundary area of the Fresnel lens are changed as in Table 1 below (expressed as "pattern 1", "pattern 2", "pattern 3", and "pattern 4" in FIG. 9). The minimum pitch and the variation width of the zones in the boundary area of the Fresnel lens (as well as the rate with respect to the basic pitch of 30 μm) are as shown in Table 1 below.

TABLE 1

|  | PATTERN 1 | PATTERN 2 | PATTERN 3 | PATTERN 4 |
| --- | --- | --- | --- | --- |
| MINIMUM PITCH (μm) | 28 | 9.75 | 22 | 15 |
| PITCH VARIATION WIDTH (μm) (RATE (%) WITH RESPECT TO BASIC PITCH | 0.25 (0.83) | 2.25 (7.5) | 0.2 (0.67) | 0.2 (0.67) |

With regard to the Fresnel lens according to the second additional example of the present invention, the distribution condition of the amount of deformation in the zonal lens surfaces, that is, the zone-slope deformation amount X (μm) (shown as "um" in FIG. 9) is measured. The measurement result is shown together with the result of the aforementioned comparison example on a graph in FIG. 9. The abscissa of the graph in FIG. 9 shows the positions of inner zones using negative values and the positions of outer zones using positive values, with the boundary zone where the zone shape changes from a circular shape to a circular-arc shape being set as "0". The numerical values on the abscissa are expressed with a freely-chosen unit, and the range shown on the graph corresponds to the section with varied pitches in the present invention.

Figure 9:
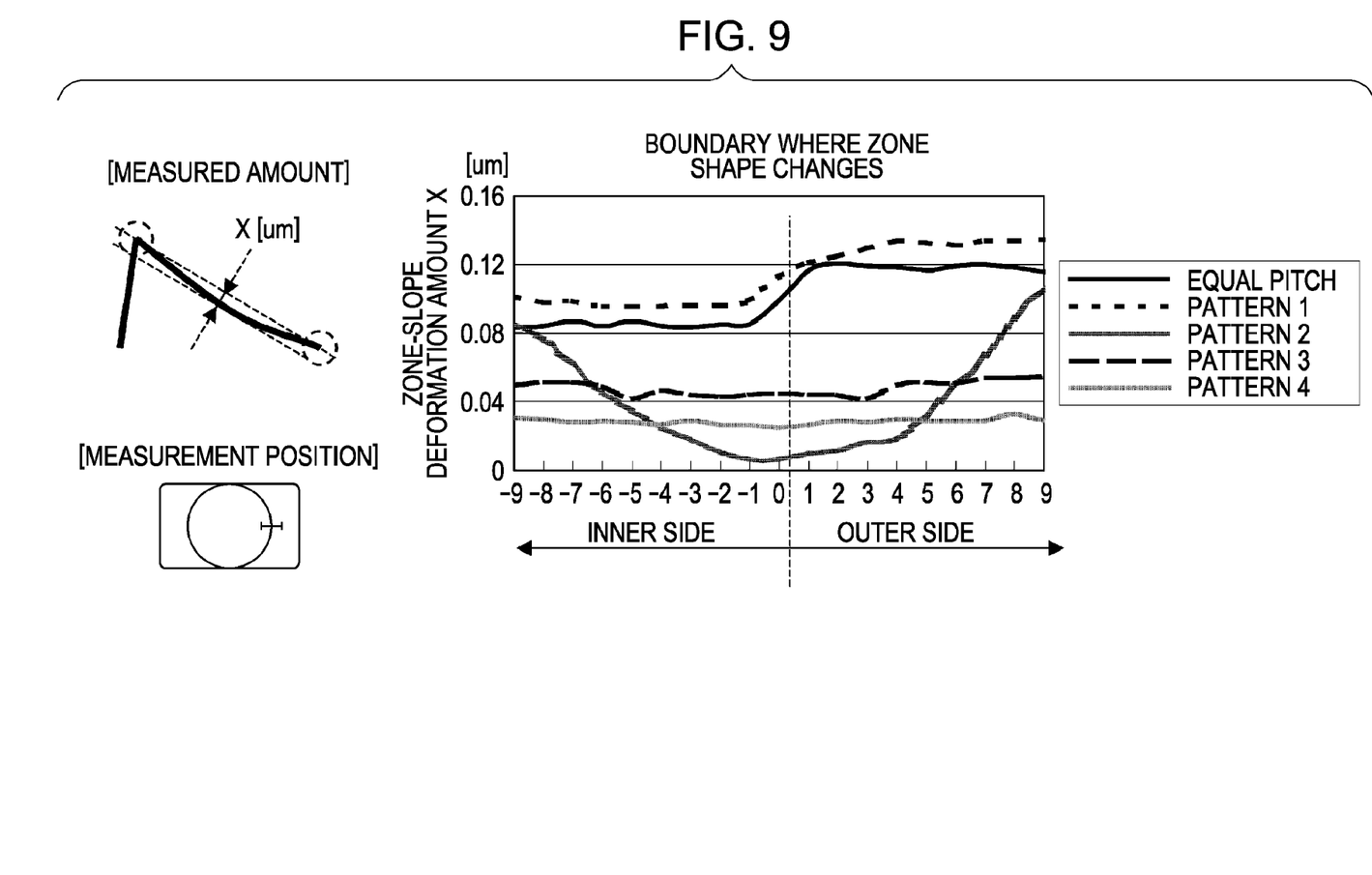
FIG. 9 illustrates another additional example of the present invention.

It is apparent from the graph in FIG. 9 that the rate of change in the shape of neighboring zone slopes is alleviated in and near the boundary where the zone shape changes. This effect allows for reduced difference in appearance and reduced difference in visibility on the actual viewfinder, as compared with a common Fresnel lens having an equal pitch, and the quality of the focusing plate is enhanced.

The rate of change in the shape of neighboring zone slopes near opposite edges of the boundary area is greater in pattern 2, as compared with patterns 1, 3, and 4. It is preferable that the rate of change in the shape of neighboring zone slopes be as small as possible over the entire boundary area. Thus, considering the result of the first additional example, the variation width of the zone pitch in the boundary area preferably ranges between 0.6% and 1.67% of the basic pitch. Specifically, if the pitch variation width is too small, the above-described effect achieved by the varied pitches may be lowered. On the other hand, if the pitch variation width is too large, the quality may deteriorate near the opposite edges of the boundary area.

While the present invention has been described with reference to various exemplary embodiments, it is to be understood that the invention is not limited to the disclosed embodiments. The scope of the following claims is to be accorded the broadest interpretation so as to encompass all modifications and equivalent structures and functions.

This application claims the benefit of Japanese Patent Application No. 2008-335061 filed Dec. 26, 2008, which is hereby incorporated by reference herein in its entirety.

What is claimed is:

1. A Fresnel lens having a plurality of concentrically-arranged circular and circular-arc zones formed on a surface of a base material thereof, comprising:

a central area having part of the plurality of circular zones formed therein;

an outer area located on an outer side of the central area and having part of the plurality of circular-arc zones formed therein; and a boundary area between the central area and the outer area and having part of the plurality of circular zones and part of the plurality of circular-arc zones formed therein, the boundary area including a boundary zone where a zone shape changes from a circular shape to a circular-arc shape, wherein the pitch of the zones in the boundary area is at minimum in the boundary zone and increases inward and outward from the boundary zone.

2. An injection mold having a shape transfer surface for forming the surface of the base material of the Fresnel lens according to claim 1 by transferring.

3. A Fresnel lens having a plurality of concentrically-arranged circular and circular-arc zones formed on a surface of a base material thereof, comprising:

a central area having part of the plurality of circular zones formed therein;

an outer area located on an outer side of the central area and having part of the plurality of circular-arc zones formed therein; and a boundary area between the central area and the outer area and having part of the plurality of circular zones and part of the plurality of circular-arc zones formed therein, the boundary area including a boundary zone where a zone shape changes from a circular shape to a circular-arc shape, wherein the pitch of the zones in the boundary area is smaller than the pitch of the zones in the central area and the outer area by 0.6% or more and 1.67% or less of the pitch of the zones in the central area and the outer area.

4. A Fresnel lens having a plurality of concentrically-arranged circular and circular-arc zones formed on a surface of a base material thereof, comprising:

a central area having part of the plurality of circular zones formed therein;

an outer area located on an outer side of the central area and having part of the plurality of circular-arc zones formed therein; and a boundary area between the central area and the outer area and having part of the plurality of circular zones and part of the plurality of circular-arc zones formed therein, the boundary area including a boundary zone where a zone shape changes from a circular shape to a circular-arc shape, wherein the outer area includes an outer boundary zone where the number of circular-arc zones with the same radius changes and an outer boundary area having a plurality of inner zones and outer zones respectively arranged on inner and outer sides of the outer boundary zone, and wherein the pitch of the zones in the boundary area and the pitch of the zones in the outer boundary area are smaller than the pitch of the zones in the central area and the outer area.

5. The Fresnel lens according to claim 4, wherein the pitch in the outer boundary area is at minimum in the outer boundary zone and increases inward and outward from the outer boundary zone.

* * * * *